Jan. 19, 1943.        R. W. ALLEN        2,308,957
TIRE SHAPING APPARATUS AND METHOD
Filed May 29, 1940        5 Sheets-Sheet 1
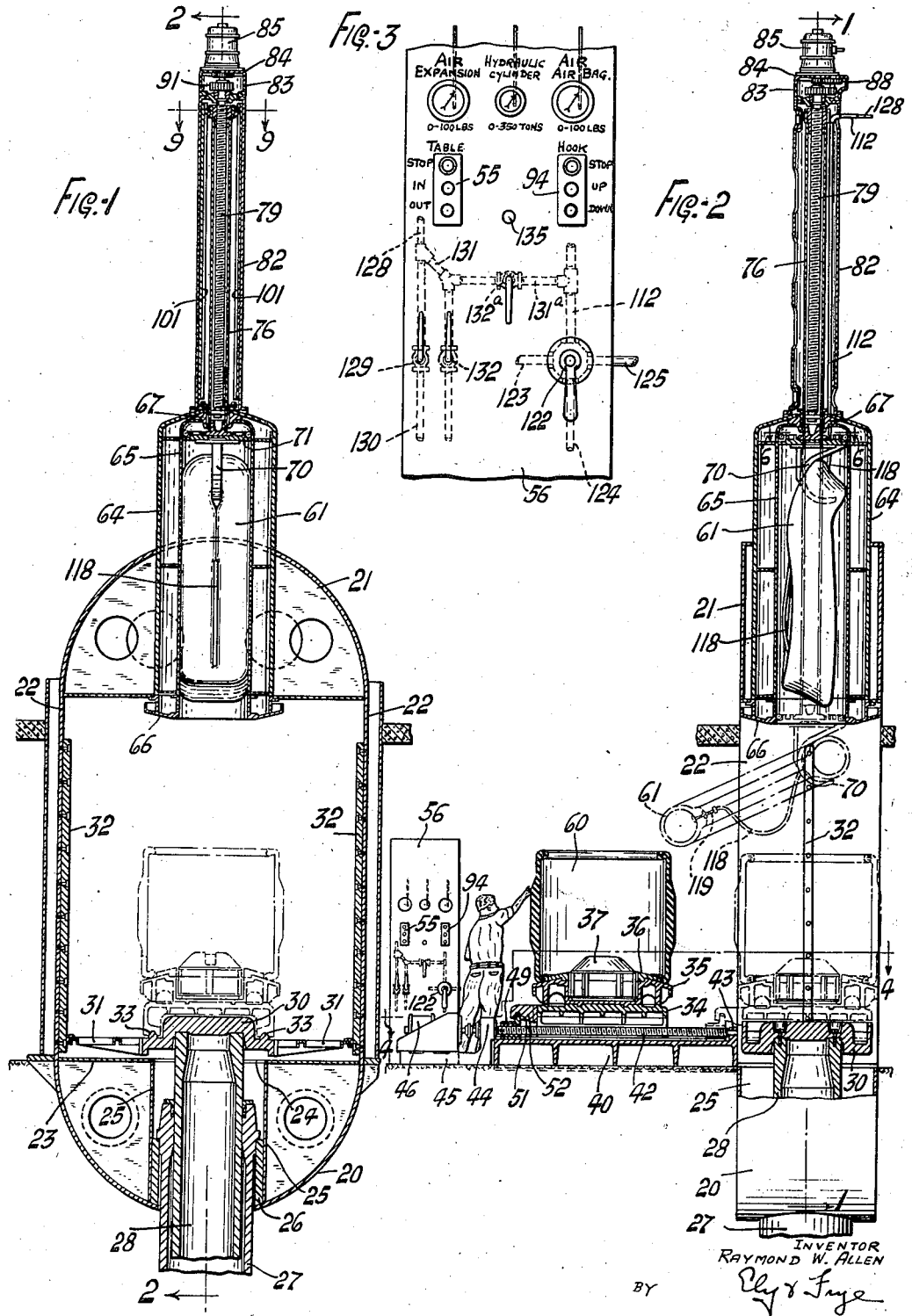
INVENTOR
RAYMOND W. ALLEN
BY
ATTORNEYS

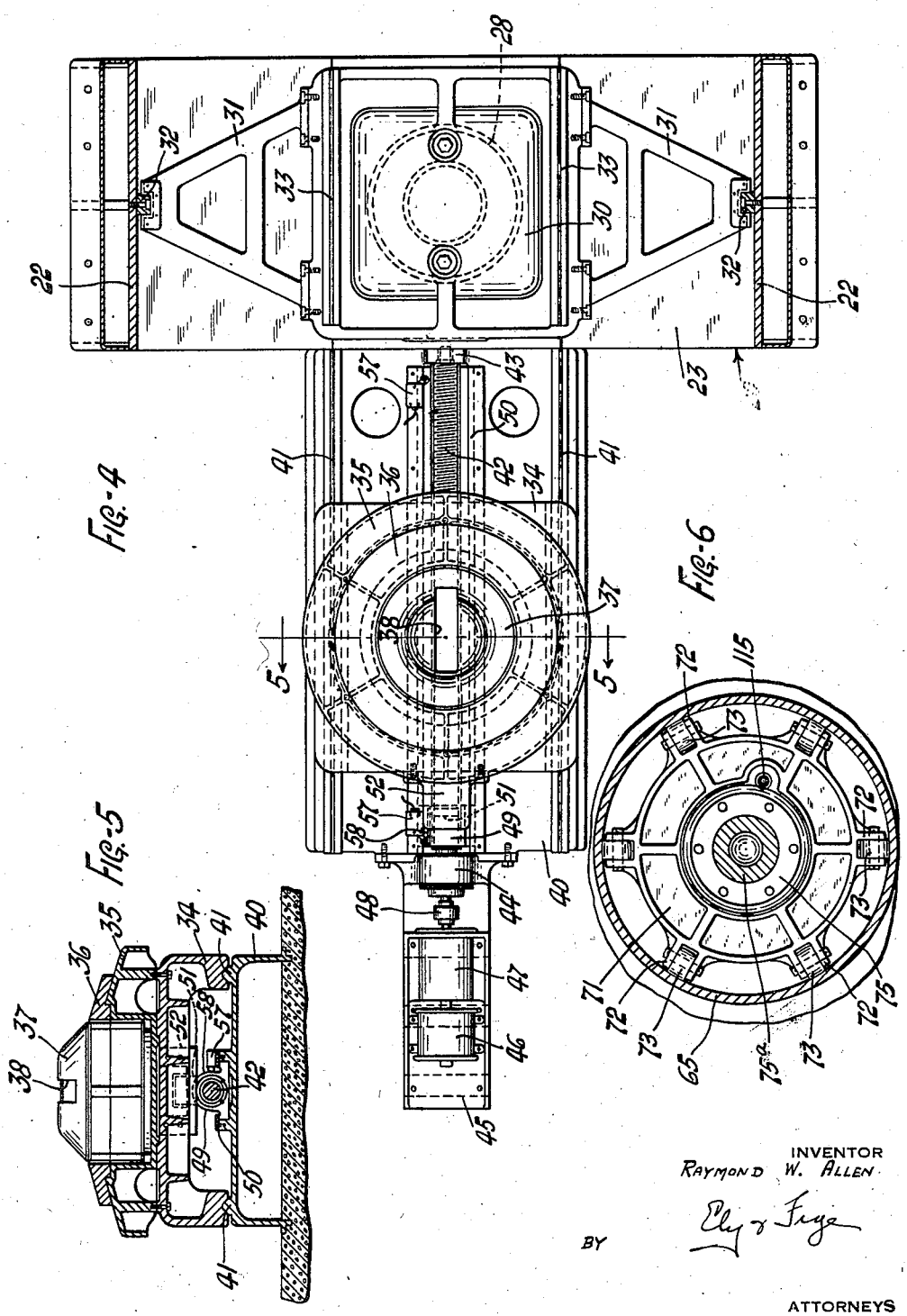

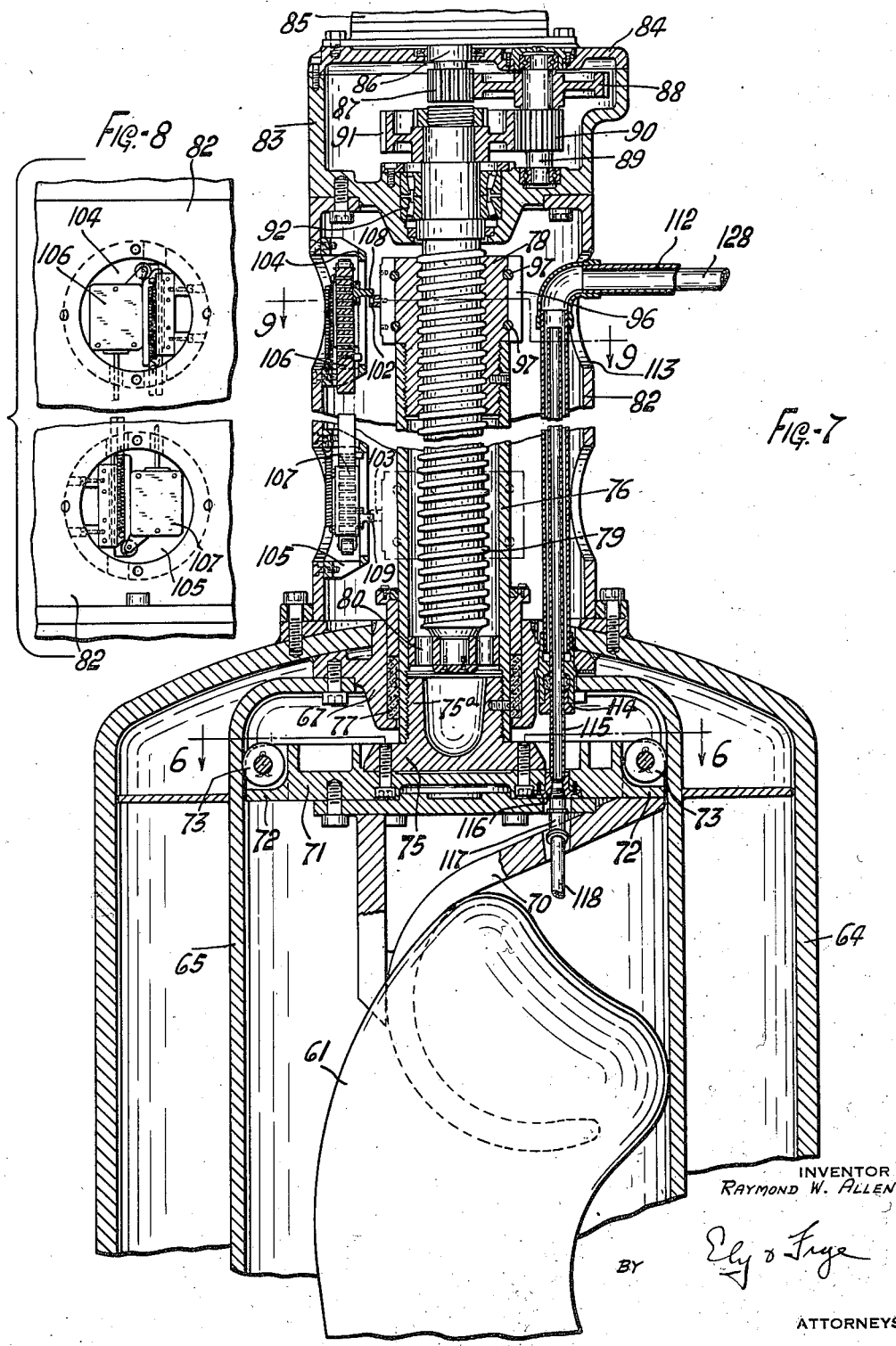

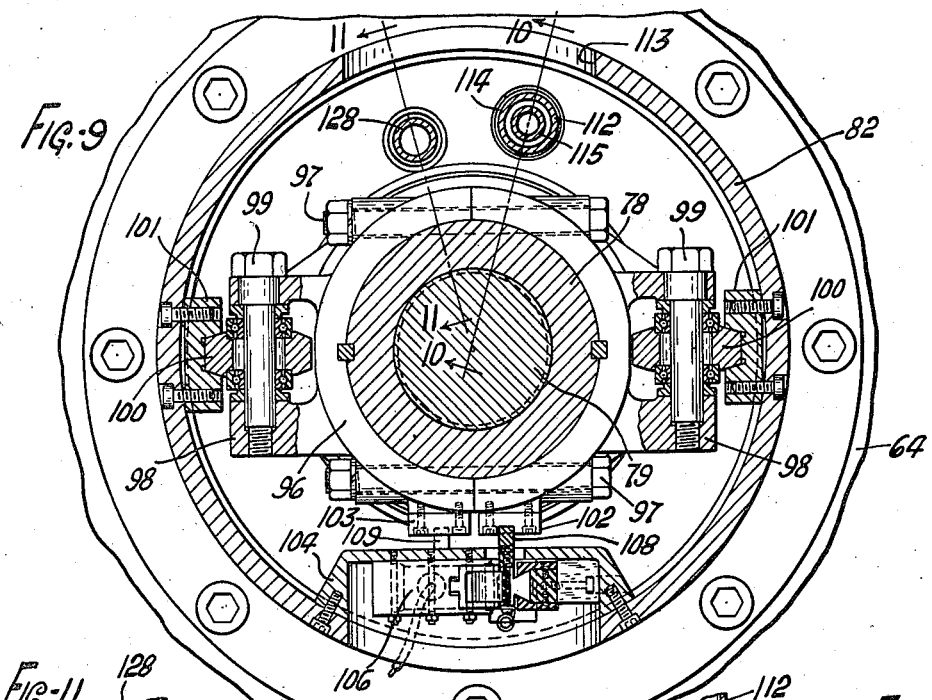

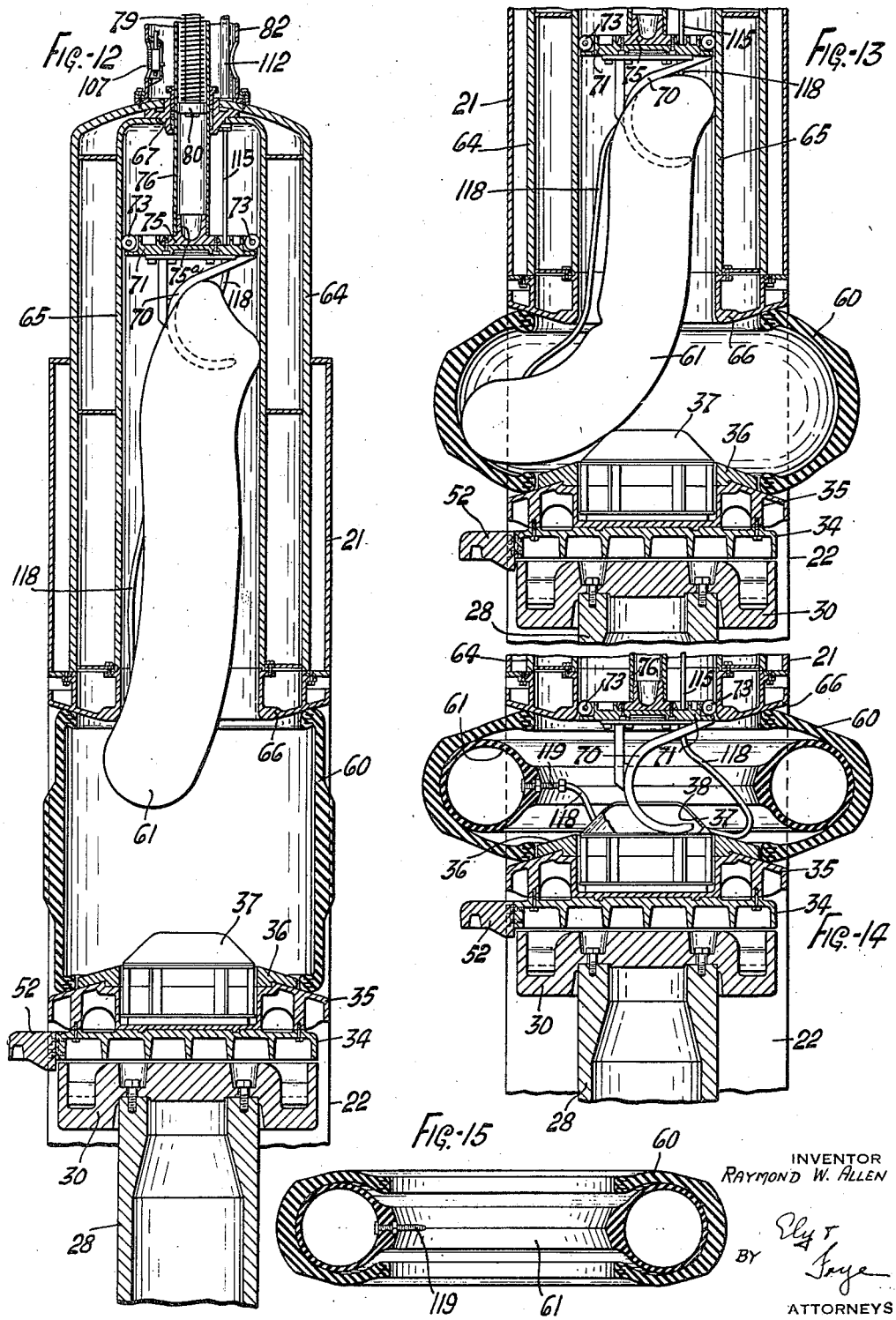

Patented Jan. 19, 1943

2,308,957

UNITED STATES PATENT OFFICE 2,308,957

TIRE SHAPING APPARATUS AND METHOD

Raymond W. Allen, Akron, Ohio, assignor to The Firestone Tire & Rubber Company, Akron, Ohio, a corporation of Ohio Application May 29, 1940, Serial No. 337,847

7 Claims. (Cl. 18—2)

This invention relates to tire shaping apparatus and methods, and more especially it relates to improved tire building apparatus and procedure for shaping drum built tire bands to tire form, and for inserting flexible, expansible cores therein during the shaping operation.

The invention is an improvement upon the subject matter of my prior United States Patent No. 2,006,307, issued June 25, 1935. The apparatus of the aforesaid patent comprised a pair of vertically aligned, opposed press heads adapted to engage the respective bead portions of a flat band tire, thereby to seal the interior of the tire while pneumatic pressure therein distended the medial portion of the tire to force it to tire shape. During said shaping operation the press heads required to move axially relatively of each other, and to this end the lower press head was retained in fixed position and the upper press head raised and lowered, an electric motor being provided for effecting such movement of the upper press head. The apparatus of the aforesaid patent functioned satisfactorily in the manufacture of most tires, but did not have sufficient power for handling extremely large tires in which the ratio of the outside diameter to the bead diameter is large, and it is to the relief of this condition that this invention is directed.

The major aspect of the invention is to provide an apparatus and method for shaping and placing the airbags in pneumatic tire casings, wherein the ratio between the outside diameter of the tire and the bead diameter is very large. In shaping and bagging such tires, the problem of preventing wrinkling of the airbag arises. Due to the fact that there is a very great difference between the size of the tire band before, and after shaping, the airbag must be put into the casing in a very wrinkled condition. If the tire is vulcanized while the airbag has a wrinkle therein, the inside of the pneumatic tire casing will not be smooth, and, consequently, chafing between the inner tube and the casing during subsequent use results. This chafing causes development of heat at these localized points, and, eventually, failure of the tire. Accordingly, one of the major objects of the present invention is to provide apparatus and method to insure that all of the wrinkles will be forced out of the airbag before the tire is subjected to vulcanization.

Further objects of the invention are to provide tire shaping apparatus of the character mentioned that is capable of shaping tire casings of the largest size; to provide increased power for moving the press heads toward each other; to conserve manual labor; and to provide means for mechanically moving the tire structure into and out of the apparatus. Other objects will be manifest as the description proceeds.

Of the accompanying drawings:

Figure 1 is a vertical transverse section of apparatus embodying the invention taken on the line 1—1 of Figure 2;

Figure 2 is a vertical fore and aft section thereof taken on the line 2—2 of Figure 1, and the work to be operated upon;

Figure 3 is a front elevation of the instrument panel of the apparatus;

Figure 4 is a sectional plan view on the line 4—4 of Figure 2, the work being omitted;

Figure 5 is a section substantially on the line 5—5 of Figure 4;

Figure 6 is a fragmentary sectional view on the lines 6—6 of Figures 2 and 7;

Figure 7 is a section, on a larger scale, of the structure shown at the upper part of Figure 2;

Figure 8 is a front elevation of a portion of the structure shown in Figure 7, showing a pair of limit switches;

Figure 9 is a section, on a larger scale, on the line 9—9 of Figures 1 and 7;

Figure 10 is a section on the line 10—10 of Figure 9;

Figure 11 is a section on the line 11—11 of Figure 9;

Figure 12 is a view, on a larger scale, of the work-engaging elements of the structure shown in Figure 2, and the work therein, in the positions they occupy in the initial phase of a cycle of operation;

Figure 13 is a view similar to Figure 12 showing the various elements at a subsequent phase of operation;

Figure 14 is a view similar to Figures 12 and 13 showing the various elements substantially at the final phase of operation; and Figure 15 is a diametric section through a tire casing and expandible core, the same constituting the completed product of the apparatus.

Referring to the drawings, there is shown a press having a frame comprising a generally semi-circular bottom member 20, a generally semi-circular upper member 21, and a pair of parallel, spaced-apart, vertically disposed lateral strain plates 22, 22, said upper and bottom members and strain plates being welded together as shown to constitute a unitary frame structure. The axis of the apparatus is vertically disposed, and extends radially through the upper and bottom members 21, 20. The bottom member 20 usually is disposed below floor level, and has a diametrically extending plate 23 that is flush with the floor level. The plate 23 is formed with central opening 24, and transverse plates 25, 25 extend from plate 23, at opposite sides of opening 24, to the arcuate bottom of the member 20. The bottom of the latter is formed with an axial opening, and interiorly of the said bottom member is a mounting ring 26 that is welded to said plates 25 at the bottom thereof, concentric with the opening in the bottom of the frame member. Received in the mounting ring 26 is the upper end portion of a hydraulic fluid pressure cylinder 27 that extends downwardly into the ground below frame member 20, said cylinder 27 having a ram 28 therein that is raised and lowered in the usual manner by the admission of water under pressure to the cylinder 27.

Mounted upon the upper end of ram 28 is a platen base 30, which, as is clearly shown in Figure 4, is square in plan. Secured to opposite lateral faces of the platen base 30 are respective triangular guide frames 31, 31, the outer end of each frame 31 being formed with a guide groove that receives a vertical guide rail 32, said guide rails being secured to the confronting faces of the respective strain plates 22. The top of the platen base, at each side thereof, is formed with parallel rails 33, 33 that extend in fore and aft direction, said rails being arranged to receive and support a movable platen 34. The platen 34 carries the lower press head 35 of the apparatus upon its upper face, said press head being of annular form, and being of frusto-conical shape, its top face being tapered upwardly toward its axis, said tapered face being adapted to engage one edge or end of a drum-built tire band as subsequently will be explained. Mounted upon the tapered face of the press head 35, concentrically therewith, is a filler ring 36 that is smaller in diameter than said head and is adapted to engage the inner circumferential surface of a tire band mounted on said head for the purpose of centering said tire accurately thereon. Mounted in the axial opening in the press head 35 is a deflector member 37 that projects somewhat above said press head and is of general frusto-conical shape with its smaller diameter uppermost. Said deflector is adapted to deflect a folded expansible core laterally into a shaped tire casing, as subsequently will be explained, and it is formed with a central slot 38 that is disposed in fore and aft direction and receives a hook from which said expansible core is suspended.

The movable platen 34 has an operative position within the press upon the platen base 30, and an inoperative loading and unloading position, exteriorly of the press at the front thereof, mechanical means being provided for moving said platen to and from its alternative position. To this end a platform 40 is located immediately in front of the press, the top of said platform being formed with a pair of rails 41, 41 that are in longitudinal alignment with the rails 33 of the platen base 30, and adapted to receive the platen 34 when the latter is moved forwardly off the platen base. For so moving the platen 34, a feed screw 42 is positioned atop of the platform 41, between the rails 41 and parallel thereto, said feed screw being journaled at one end in a bearing bracket 43 formed on the platform at the end thereof that abuts the press, the other end of the screw being journaled in a bearing formation 44 that is integral with a base plate 45 mounted at the other end of said platform. The base plate 45 supports a reversible electric motor 46, and a reduction gear device 47 that is operatively connected thereto, said reduction gear device being connected to the feed screw 42 by means of a coupling 48. The feed screw 42 is threaded through a traveler nut 49 that is slidably mounted in a slideaway 50 on the top face of the platform 40. The nut 49 is formed with an upstanding tongue 51 that is engageable in a complementally shaped downwardly opening recess formed on the under side of a connector block 52 that is secured to the front marginal face of the platen 34. The arrangement is such that rotation of the feed screw 42 in either direction will move the traveler nut 49 in its slideway longitudinally of the screw 42, and thus will propel the platen 34, and structures thereon, either into the press, as shown in broken lines in Figures 1 and 2, or out of the press and onto the platform 40 as shown in full lines in Figures 2 and 4. When the platen is in the press it rests upon the rails of the platen base 30, with its axis coincident with the axis of the press, and elevation of the ram 28 will elevate the platen and move its connector block 52 out of engagement with the upstanding tongue 51 of nut 49. The tongue and connector block re-engage each other upon subsequent lowering of the ram and platen.

The starting of the motor 46 is effected manually by the operator of the apparatus, and for this purpose a suitable group of switch buttons 55 are mounted upon an instrument panel 56, Figures 2 and 3, that is positioned conveniently close to the apparatus. Stopping of the drive of the motor 46 is effected automatically, and to this end limit switches 57, 57 are mounted upon the top of slideway 50 at the respective ends of the traverse of the nut 49, the latter being formed with a lateral cam surface 58 adapted to engage and operatively swing the operating levers of the respective switches 57.

The feature of moving platen 34 and press head 35 to a position outside the press for loading and unloading purposes saves time and labor, since the relatively large tires for which the press is designed are of great weight. The press is designed to distend a drum built tire band 60 to tire shape and to insert an expansible core 61 into the tire. The size of the tire band 60 readily can be judged by comparison with the size of the operator shown besides the tire band in Figure 2.

Referring now to the upper part of the press structure, there is shown a tubular housing 64 that has its axis coincident with the vertical axis of the press, said housing being permanently secured in the upper frame member 21 and having its upper end projecting above the latter. Mounted interiorly of the housing 64, concentrically thereof, is a hollow cylinder 65. Secured to the bottom face of the upper frame member 21 and to the lower end of cylinder 65 is an annular, frusto-conical, upper press head 66, that tapers downwardly toward its axis, reversely of the taper of lower press head 35, the inner circumference of the press head 66 being coincident with the inner circumference of the cylinder 65. The tapered face of press head 66 is adapted to engage the upper edge of tire band 60 during operation of the apparatus in the same manner as in my prior U. S. patent aforementioned. The upper ends of housing 64 and cylinder 65 are disposed adjacent each other and secured together by means of an interposed, annular gland 67. The cylinder 65 is designed to receive the expansible core 61, in collapsed condition, in the operation of the apparatus.

For drawing the core 61 into the cylinder 65, a hook 70 is provided, which hook opens toward the rear of the apparatus, as shown. The hook 70 is secured to the bottom face of a generally circular hook-mount 71, the latter being spaced from the wall of the cylinder 65 and provided with a plurality of radially extending slotted ears 72, 72, Figure 6, in which respective guide rollers 73 are mounted. Said rollers engage the cylinder wall and maintain the mount 71 centrally therein. Secured to the top face of hook-mount 71, co-axially thereof, is a hook-base 75 having an upstanding externally threaded portion 75a upon which the lower end of a tubular sleeve 76 is mounted and fixedly secured, said sleeve extending upwardly therefrom and through suitable packing 77 in the gland 67. The upper end of sleeve 76 is telescopically secured to a nut 78, and threaded axially through said nut is a vertically arranged feed screw 79, the lower end of the latter being provided with a spider-like circular stabilizer 80 that has a sliding fit within the sleeve 76.

Mounted upon the top of the housing 64, co-axially thereof, is a tubular upper housing 82, the latter being of smaller diameter than the housing 64. Mounted atop of upper housing 82 is a hollow gear case 83 that has its open top provided with a cover 84, and surmounting the latter is a reversible electric motor 85 that is disposed on a vertical axis, the shaft 86 of said motor extending into the interior of said gear case 83, in axial alignment with the feed screw 79. Mounted upon the lower end of motor shaft 86 is a gear 87 that is meshed with a pinion 88 of larger diameter, the latter being mounted upon a vertical countershaft 89 that has its ends journaled in suitable bearings in the gear case 83 and its cover 84. Also mounted upon countershaft 89 is a gear 90 that is meshed with a larger size pinion 91 mounted upon the upper end of feed screw 79. The arrangement is such that the motor 85 drives the feed screw 79 in either direction, but at reduced speed by reason of the intervening gears. The gear case 83 also carries a suitable double thrust bearing 92 in which the upper end portion of the screw 79 is journaled.

The motor 85 is adapted to raise and lower the hook 70 between the respective positions shown in full lines and in broken lines in Figure 2. The starting of said motor is effected manually by the operator of the apparatus, and for this purpose a suitable group of switch buttons 94 are mounted upon the instrument panel 56. Stopping of the drive of motor 85 is effected automatically as the hook attains determinate alternative positions by limit switches presently to be described.

A portion of the nut 78 projects beyond the upper end of sleeve 76, and mounted upon said projecting portion is a two-part collar 96, the halves of which are secured together by bolts 97, 97 (see Figure 9). The collar 96 is formed at diametrically opposite points with laterally projecting pairs of ears 98, and each pair of ears supports a horizontally disposed pivot pin 99 that is mounted therein. Journaled on suitable bearings carried by each pivot pin 99 are respective rollers 100, which rollers have lateral faces that taper toward their perimeters, said rollers being received in grooves formed in respective vertical guide-rails 101 that are mounted on the inner surface of the housing 82, at opposite sides thereof. The arrangement constitutes a guide for the nut 78, and prevents angular movement of the latter, and structures connected thereto, notwithstanding torsional strain imposed thereon by rotation of the feed screw 79.

Means is provided whereby travel of the nut 78 effects the stopping of the drive of the motor 85 at the upper and lower limits of the traverse of said nut, and to this end a pair of blocks or fingers 102, 103 are employed, said blocks being mounted beside each other, upon the respective halves of the nut collar 96, facing the front of the apparatus. Cup-like switch supports 104, 105 are mounted upon the inner wall of the housing 82, behind apertures formed therein facing the front of the apparatus, and respective limit switches 106, 107 are mounted upon said supports, which switches are in the electrical circuit of the motor 85. The switches 106, 107 are located adjacent the upper end and lower end of the housing 82, and are readily accessible through the apertures aforementioned in the front of the latter. The switches 106, 107 comprise spring tensioned operating fingers 108, 109 respectively of which finger 108 extends into the vertical course of nut-block 102 and finger 109 extends into the vertical course of nut-block 103. Thus nut-block 102 operates limit switch 106 to stop the motor 85 at the upper limit of travel of nut 78, as shown in full lines in Figure 7, and nut-block 103 operates limit switch 107 to stop the motor at the lower limit of travel of the said nut as indicated in broken lines in the same figure.

As previously stated, the expansible core 61 is drawn into the cylinder 65 by the hook 70 while said core is in collapsed condition. Collapsing of the core is facilitated by the withdrawal of air therefrom before the hook is moved from its lowered position to its elevated position, and to this end a pipe 112 extends into the upper housing 82 through an aperture 113 in the latter, at the rear thereof and near its upper end, as best shown in Figures 7 and 9. The pipe 112 extends downwardly within the housing 82 and terminates at the bottom thereof in a slip joint 114 that comprises the usual gland and packing, said slip joint being mounted in the larger gland 67 that connects the lower housing 64 and cylinder 65. Telescoped within the vertical portion of pipe 112 is a smaller pipe 115 that slidably extends through the slip joint 114 and has its lower end threaded into the upper end of a pipe coupling 116 mounted in a suitable bore that extends through hook-mount 71. Threaded into the lower end of coupling 116 is an elbow 117 that extends through suitable apertures formed at the upper end of hook structure 70 (see Figures 7 and 10), there being a flexible hose 118 connected to said elbow. The delivery end of the hose 118 is attachable to the inflating stem 119 of the expansible core 61 in the usual manner, as is best shown in Figure 14.

Collapsing of the core 61 is effected by suction applied thereto through the agency of the piping aforementioned. The said core also requires to be expanded by partial inflation thereof as it is inserted into the shaped tire, for causing the core to assume its normal circular form and thereby to fill the tire. Inflation of the core may be effected by means of air, but preferably is effected by means of an inert gas, such as carbon dioxide ($CO_2$), since the latter has no oxidizing effect upon the rubber body of the core, and the same piping is utilized both for inflating the core and for exhausting and collapsing the same. To this end the pipe 112 extends to a manually operated four-way valve 122 that is mounted on the instrument panel 56, said valve also having connection with a pipe line 123 extending to a source of suction (not shown), a pipe line 124 extending to a source of carbon dioxide under pressure (not shown), and a pipe line 125 extending to a source of air under pressure (not shown).

The shaping of the tire 60 from the flat band shape shown in Figure 12 to the finished shape shown in Figure 15 is effected by super-atmospheric pressure applied to the interior of the tire band after the ends thereof are in sealed engagement with the upper and lower press heads 66, 35 respectively, and as the latter is rising. For delivering air under pressure to the interior of the tire band in the apparatus, a supply pipe 128 enters the apparatus through the aperture 113 aforementioned in the upper housing 82, said pipe extending downwardly in said housing and being threaded into a bore in the gland 67, as shown in Figure 11, the arrangement being such that said pipe discharges into the upper end of cylinder 65. Since the hook-mount 71 is spaced from the wall of said cylinder, except locally where the rollers 73 engage the same, it will be obvious that air from the pipe 128 is enabled to move to the open bottom of said cylinder and enter the tire band 60 so as to distend the latter. This is possible even though the collapsed core 61 is within the cylinder since the core does not completely fill the cylinder. The pipe 128 extends to the instrument panel 56 where it connects with a manually operated valve 129, the latter having connection with a source of air pressure (not shown) through the agency of a pipe 130. At the instrument panel an exhaust pipe 131 is connected to pipe 128, said exhaust pipe being provided with a manually operated valve 132 located on said instrument panel.

A by-pass pipe 131a is connected between pipe 112 and 131 and is provided with a manually operable valve 132a. The purpose of this by-pass and valve, as will more fully appear hereinafter, is, if desired, to control the differential pressure between the inside of the core 61 and the inside of the cylinder 65 whereby this differential can be varied to prevent or to work out any wrinkles which may form in the core 61 as it enters the tire band 60.

The raising of the ram 28 is effected by means of water under pressure admitted to the cylinder 27, the ram descending by gravity when the water is evacuated from the cylinder, according to well known practice. The admission of water to the hydraulic cylinder, and its evacuation therefrom is under the control of the operator, there being a manually operated valve (not shown) provided for this purpose.

In the operation of the apparatus, the respective parts thereof being in the positions shown in Figures 1 and 2 except that the hook 70 is in the position shown in broken lines in Figure 2, an expansible core 61 is suspended from the hook 70 and the flexible hose 118 is connected to the inflating stem 119 of said core, said inflating stem preferably being at the lower side of said core. The operator then turns the handle of valve 122 to the position wherein suction is applied to the interior of the core to evacuate the latter and cause the collapse of the walls thereof, after which he presses the proper button of the switch group 94 to set the motor 85 in operation to rotate the screw 79 in the proper direction to raise the hook-mount 71 and with it the hook 70. The rising hook carries with it the core 61, the latter thereby being folded and elongated, and pulled up into the interior of cylinder 65, as shown in full lines in Figures 1 and 2. During this operation the operator pulls the lower end of the core forwardly so that the core assumes a determinate position in the cylinder 65 so that upon subsequent ejection from said cylinder it will emerge therefrom in a non-axial direction. The motor 85 stops rotating automatically when the collar block 102 engages switch finger 108 and opens limit switch 106, as shown in Figure 7.

The operator then mounts a tire band upon the lower press head 35 while the latter is positioned in front of the press, as shown in full lines in Figure 2, after which he operates the proper switch of the switch group 55 to set the motor 46 in operation. The motor rotates in the proper direction to cause the screw 42 to feed the platen, and head 35 thereon, toward the press, the drive of the motor automatically being stopped by the limit switch 57 nearest the press, at which time the platen, press head, and the work thereon are positioned upon the platen base 30 of the press, in axial alignment with the axis of the press. The operator then operates the proper valve (not shown) to admit hydraulic pressure to the cylinder 27 with the result that the ram 28 is moved upwardly, carrying with it the platen 34 and press head 35, the latter thereby being disengaged from the tongue 51 of the feed-nut 49. Continued rise of the ram 28 eventually causes the upper bead of the tire band 60 to engage the upper press head 66, as shown in Figure 12, and as soon as this occurs the operator opens valve 129 to admit air at superatmospheric pressure to the interior of the tire band to bow and distend the middle thereof as the lower press head continues to move the lower bead of the tire toward the upper bead thereof.

The foregoing phase of operation continues until the tire band is sufficiently distended and the upper and lower press heads are relatively near each other. The operator then closes valve 129 and temporarily opens valve 132 to lower the tire pressure somewhat, and then lowers the ram 28 until the upper and lower press heads are separated substantially the distance shown in Figure 13. Next the proper button of switch 94 is operated to set the motor 85 in motion to operate screw 79 in the proper direction to lower hook mount 71 and hook 70, and valve 122 is opened to admit pressure fluid, such as inert gas, to the core 61, but to a different pressure than is present in the tire. As the core is fed downwardly by the lowering hook mount and hook, the leading end of said core is deflected laterally by deflector 37 so that it moves toward the inner circumferential wall of the tire 60. The concurrent inflation of the said core causes it progressively to assume its normal circular form and thus progressively to fill the tire. At its lowermost position the hook 70 is positioned in slot 38 of deflector 37, thus assuring that the core will be completely disengaged from the hook, as is best shown in Figure 14. Downward movement of the hook ceases when block 103 engages and operates limit switch 107 to stop motor 85. A signal lamp 135 mounted upon the instrument panel 56 burns when the motor 85 is running, the extinguishing of this lamp indicating when the hook 70 is at its uppermost or lowermost limit. The operator then elevates the ram 28 somewhat, to complete the shaping of the tire about the core, the press heads thereby being moved to the relative positions shown in Figure 14. Thereafter the pressure in the core 61 and in the tire 60 are lowered at substantially the same time and to a substantial degree, care being taken to maintain a small differential pressure of between five and ten pounds in order to prevent wrinkles from forming in the core. Then tire and core are reinflated, but somewhat below original maximum pressures, the said pressure differential being maintained. This operation may be repeated two or three times, each lowering the pressures more than they are raised each time.

Finally the valve 122 is turned to neutral position to evacuate the core 61 of pressure fluid therein, and the valve 129 is closed and valve 132 opened to exhaust the pressure fluid from within tire 60. The valve controlling the hydraulic ram 28 is next operated to lower said ram, and with it the platen 34, lower press head 35, and the shaped tire 60 with core 61 therein, the operator disconnecting the hose 118 from the core as soon as the latter reaches a conveniently low position. As the ram comes to rest at its lowermost position the connector block 52 of platen 34 operatively engages the upstanding tongue 51 of feed-nut 49. The operator then presses the proper button of switch 55 to set the motor 46 in operation to turn the feed screw 42 in the direction that moves the platen 34 out of the press and back to point of starting, the motor automatically being stopped by the other limit switch 57 as the platen reaches its determinate inoperative position. This completes a cycle of operation which may be repeated as desired.

The invention is particularly advantageous in the manufacture of tires of relatively large size in that the hydraulic lift provides the relatively high pressure necessary to force the beads of the tire toward each other, and the movable lower press head makes it possible to mount tire bands thereon and remove finished tires therefrom at a point removed from the press, when mechanical tire-handling apparatus is available.

Modification may be resorted to without departing from the spirit of the invention, or the scope thereof as defined by the appended claims.

What is claimed is:

1. In apparatus of the character described, the combination of a stationary upper head adapted to engage the upper marginal portion of flat band tire, a fluid pressure operated ram in axial alignment with said upper head, a lower head adapted to support a flat band tire by engagement with the lower marginal portion thereof, and means at one side of said ram for moving said lower head between a position at one side of said ram and a position in axial alignment with said ram so as to be raised and lowered by the latter, said means being so constructed and arranged as to be disengaged from the head by elevation of the latter by the ram.

2. In apparatus of the character described, the combination of a stationary upper head adapted to engage the upper marginal portion of a flat band tire, a fluid pressure operated ram in axial alignment with said upper head, platen base mounted upon the top of said ram, a pair of parallel rails on the top of said platen base, a platform in front of the apparatus, a pair of parallel rails on said platform in alignment with the rails of said platen base, a platen slidable upon said rails, a lower head on said platen, said head being adapted to support a flat band tire by engagement with the lower marginal portion thereof, and means for moving said platen along said rails between a position exteriorly of the apparatus and a position upon said platen base, said means being so constructed and arranged as to be disengaged from said platen by the elevation of the latter by the ram.

3. In apparatus of the character described, the combination of a stationary upper head adapted to engage the upper marginal portion of a flat band tire, a fluid pressure operated ram in axial alignment with said head, a lower head adapted to support a flat band tire by engagement with the lower marginal portion thereof, said lower head being positionable upon the ram, and alternatively, at a position at one side of the ram, and a power driven member operatively and detachably connected with said lower head in the lowered position of the ram for moving the head between said alternative positions, said member being located entirely at one side of the ram and disconnected from said lower head by the lifting of the latter by the ram.

4. In apparatus of the character described, the combination of a stationary upper head adapted to engage the upper marginal portion of a flat band tire, a fluid pressure operated ram in axial alignment with said upper head, a platen base mounted upon the top of said ram and formed with a pair of parallel rails on its top extending fore and aft thereof, a platform in front of the ram formed on its top with parallel rails in alignment with the rails on said platen base, a platen mounted on said rails, a lower head mounted on said platen and adapted to support a flat band tire by engagement with the lower margin thereof, a reversible feed screw on said platform extending parallel to the rails thereof, means for rotating said feed screw, and a nut through which the feed screw is threaded, said nut being releasably engageable with said platen and adapted to move the latter onto and off of the platen base on the ram.

5. A combination as defined in claim 4 in which the means for rotating the feed screw is a reversible motor, including limit switches disposed in the path of the platen adapted to effect stopping of the motor when the platen reaches determinate positions at each end of its travel.

6. A combination as defined in claim 4 in which the feed nut is formed with an upstanding tongue that is receivable in a downwardly opening recess on the under side of the platen structure, whereby disengagement of the nut and platen is effected when the platen is elevated by the ram.

7. The method of shaping tire casings which comprises sealing and applying axially directed force to the respective margins of a transversely flat tire band and concurrently introducing pressure fluid in the band to distend the middle thereof, moving said margins of the tire apart a short distance, introducing an expansible core into the tire and concurrently introducing pressure fluid into said core but to a different pressure than in the band, again moving the tire margins toward each other, and thereafter decreasing and increasing the fluid pressures in the tire and core a number of times, each increase being followed by a decrease of greater magnitude and the pressure differential between tire and core being maintained.

RAYMOND W. ALLEN.